United States Patent
Dawson et al.

(10) Patent No.: US 6,787,225 B2
(45) Date of Patent: Sep. 7, 2004

(54) RADIATION CURABLE COATING HAVING LOW GLOSS AND COATED ARTICLES MADE THEREFROM

(75) Inventors: William R. Dawson, Matteson, IL (US); Tai M. Liang, Frankfort, IL (US); Joseph E. Miller, Lemont, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 168 days.

(21) Appl. No.: 10/223,306

(22) Filed: Aug. 16, 2002

(65) Prior Publication Data

US 2003/0054116 A1 Mar. 20, 2003

Related U.S. Application Data

(62) Division of application No. 09/724,149, filed on Nov. 28, 2000, now Pat. No. 6,448,302.
(60) Provisional application No. 60/176,834, filed on Jan. 19, 2000.

(51) Int. Cl.[7] ............................. B32B 27/16; B32B 7/10
(52) U.S. Cl. ...................... 428/345; 428/354; 428/343; 428/484; 428/412; 428/480; 428/500; 428/515
(58) Field of Search ................................. 428/343, 345, 428/354, 412, 484, 480, 500, 515; 522/8, 10, 14, 77, 83, 121, 182; 427/508, 519

(56) References Cited

U.S. PATENT DOCUMENTS

| | | | | |
|---|---|---|---|---|
| 3,918,393 A | * | 11/1975 | Hahn | 427/494 |
| 4,048,036 A | * | 9/1977 | Prucnal | 522/8 |
| 4,201,642 A | * | 5/1980 | Nowak | 522/74 |
| 4,239,077 A | * | 12/1980 | Dixon et al. | 156/273.5 |
| 4,303,696 A | * | 12/1981 | Brack | 427/503 |
| 4,343,856 A | * | 8/1982 | Goswami et al. | 428/332 |
| 4,439,480 A | * | 3/1984 | Sachs et al. | 428/161 |
| 4,599,260 A | * | 7/1986 | Truskolaski et al. | 428/207 |
| 4,640,938 A | * | 2/1987 | Romer et al. | 522/79 |
| 4,644,077 A | * | 2/1987 | Gupta | 556/457 |
| 4,745,003 A | * | 5/1988 | Sirkoch et al. | 427/514 |
| 5,387,304 A | * | 2/1995 | Berner et al. | 156/212 |
| 5,468,542 A | * | 11/1995 | Crouch | 428/215 |
| 5,503,891 A | * | 4/1996 | Marshall et al. | 428/99 |
| 5,559,163 A | * | 9/1996 | Dawson et al. | 522/75 |
| 5,585,415 A | * | 12/1996 | Gorzalski et al. | 522/18 |
| 5,591,290 A | * | 1/1997 | Walter et al. | 156/152 |
| 5,622,565 A | * | 4/1997 | Ye et al. | 118/723 R |
| 5,641,571 A | * | 6/1997 | Mayer et al. | 428/402 |
| 5,727,818 A | * | 3/1998 | Schmeida | 10/223 |
| 5,837,745 A | * | 11/1998 | Safta et al. | 522/8 |
| 5,888,649 A | * | 3/1999 | Curatolo et al. | 428/352 |
| 5,889,083 A | * | 3/1999 | Zhu | 523/161 |
| 5,908,526 A | * | 6/1999 | Ainscough | 156/272.2 |
| 5,959,020 A | * | 9/1999 | Oliveri et al. | 524/487 |
| 5,968,996 A | * | 10/1999 | Sanchez et al. | 522/148 |
| 5,981,626 A | * | 11/1999 | Santini et al. | 523/161 |

* cited by examiner

Primary Examiner—Susan Berman
(74) Attorney, Agent, or Firm—Robert E. McDonald; Arthi K. Tirey; Vivien Y. Tsang

(57) ABSTRACT

A radiation curable coating comprising:
  (i) at least one radiation polymerizable reactant;
  (ii) at least one initiator for initiating cure;
  (iii) at least one wax;
wherein the wax is present in an amount sufficient to reduce the 60° gloss of the cured coating to a gloss level less than 40 when the coating is cured by exposure to radiation in the presence of oxygen to provide a dry film thickness of 1.0±0.1 mil.

41 Claims, No Drawings

RADIATION CURABLE COATING HAVING LOW GLOSS AND COATED ARTICLES MADE THEREFROM

This application is a divisional of 09/724,149 filed Nov. 28, 2000 now U.S. Pat. No. 6,448,302 which claims the benefit of 60/176,834.

BACKGROUND OF THE INVENTION

1. Field of the Invention

This invention relates to radiation curable coatings, especially UV curable coatings, comprising:

(i) at least one radiation polymerizable reactant, preferably one or more monomers;

(ii) at least one initiator; and (iii) at least one wax, preferably polytetrafluoroethylene wax.

These coatings are characterized in that they can produce a 60° gloss of less than 40 when the coating is cured by exposure to radiation in the presence of oxygen to provide a dry film thickness of 1.0±0.1 mil.

One useful application of the radiation curable coatings is obtained by applying the coating to a substrate followed by exposure to radiation in the presence of oxygen until cured. One preferred application involves the use of a flexible sheet as the substrate and an especially preferred application involves a flexible sheet having a first side and a second side opposite to the first side, wherein the second side, either before or after the application and/or cure of the radiation polymerization coating, is coated with an adhesive material, and wherein the radiation curable coating is cured by exposing the applied coating to radiation in the presence of oxygen. Once the radiation polymerizable coating has been cured, the adhesive side can then be adhesively applied to any rigid or flexible substrate.

The cured coatings of this invention are especially useful in applications where an abrasion resistant, smooth, cured surface is desirable such as in the preparation of "white boards" which can erasibly accept markings from a dry mark or dry erase writing implement.

2. Description of the Prior Art

Some methods of producing low gloss radiation curable coatings have been known in the art. For example, U.S. Pat. Nos. 3,918,393 and 4,048,036 teach radiation polymerizable coatings having relatively low gloss. Additionally, preparation of flexible sheets which are coated on one side with a polymerizable coating and on the other side with an adhesive have also been taught as set forth, for example, in U.S. Pat. No. 5,387,304.

BRIEF SUMMARY OF THE INVENTION

This invention relates to radiation curable liquid coating compositions comprising:

(i) at least one radiation polymerizable reactant;

(ii) at least one initiator; and (iii) at least one wax.

The coatings can be applied to any substrate and then cured by exposure to radiation thereby providing smooth, abrasion-resistant cured coatings which can erasibly accept markings from a dry erase writing implement.

The coatings can be cured by any suitable radiation such as electron beam or visible light or, especially preferred, ultraviolet radiation. Although it is not our intent to be bound by theory, it is believed that when the coatings of this invention are cured by exposure to radiation in the presence of oxygen, the oxygen inhibits, but does not totally prevent the cure of the coating at its surface. As a result, the rate of cure is fastest at the "bottom" of the liquid coating and slowest at the surface. It is believed that as a result of this bottom-up curing mechanism that the wax is forced toward the surface of the curing film as the cure takes place. By selecting a sufficient amount of an appropriate wax, the cured coating can provide a hard, abrasion resistant, smooth finish with a high concentration of wax at or near the surface. The wax, apparently as a result of this curing mechanism, appears to provide the dual benefit of a reduction of gloss in the coating, and a top surface of the cured film having a smooth finish which erasibly accepts the markings of dry erase writing implements. Sufficient cure inhibition at the surface can be provided at levels of oxygen in excess of 1,000 parts oxygen per 1,000,000 parts atmosphere. Higher levels of oxygen are also practical, and it is especially convenient to utilize regular atmospheric air.

In one preferred application, the coatings of this invention are applied to a planar flexible sheet having a first side and a second side opposite to the first side, wherein the second side is coated with an adhesive material, and wherein said first side is coated with a cured film of the coating of this invention which is exposed to polymerizing radiation in the presence of oxygen until cured.

Accordingly, one object of this invention is to provide improved radiation curable liquid coating compositions. Another object is to provide radiation curable compositions having low gloss and a smooth, abrasion-resistant surface which can erasibly accept markings from a dry erase writing implement. A further object of this invention is to provide flexible substrates wherein at least one side of the flexible substrate is coated with the coating of this invention and, optionally, the second side is coated with an adhesive material. These and other objects of the invention will become apparent from the following discussions.

DETAILED DESCRIPTION OF THE INVENTION

The radiation polymerizable reactants suitable for use in this invention can be any compound having polymerizable ethylenic unsaturation such as unsaturated polymers, oligomers, monomers or combinations thereof. Representative polymeric or oligomeric polyunsaturated compounds are well known in the art and can include, for example, unsaturated polyesters obtained by the reaction of polyols and maleic or fumaric acid, reaction products of polyacids or polyisocyanates with unsaturated alcohols, reaction products of polyepoxides and unsaturated acids such as acrylic or methacrylic acids, reaction products of polyols and unsaturated acids or esters, and other methods well known in the art.

For many applications, it is especially preferred to utilize unsaturated monomers and/or oligomers in order to minimize the viscosity and provide the highest application solids of the curable coatings. Especially useful monomers include vinyl and allyl compounds such as styrene, vinyl acetate, vinylidene chloride, and (meth)acrylates of monohydric alcohols, acrylamides and similar (meth)acrylate acid derivatives, such as methylmethacrylate, hydroxyethyl acrylate, acrylonitrile, and acrylamide. Especially preferred in the practice of this invention are the alkyl di-, tri-, and poly-acrylates such as, for example, ethylene glycol diacrylate, 1,3-propylene glycol diacrylate, 1,4-butanediol diacrylate,1,4-cyclohexane diacrylate, 1,6-hexanediol diacrylate, neopentyl glycol diacrylate, 1,5-pentanediol diacrylate, 1,8-octanediol diacrylate, trimethylol propane triacrylate, pentaerythritol triacrylate, pentaerythritol tetraacrylate, and dipentaerythritol pentaacrylate. For some applications it is also preferred to include unsaturated fluoronated materials such as fluoroalkyl(meth)acrylates as part of the curable composition.

It is especially preferred in the practice of this invention to utilize monomers which exhibit a significant amount of shrinkage, or change in density, as a result of their polymerization from monomers to homopolymers. Although it is not our intent to be bound by theory, it is believed that this rapid change in density upon cure, in combination with the oxygen inhibition of cure at the exposed surface of the coating, combine to force the wax to the surface of the cured polymer in order to provide the low gloss and smooth abrasion-resistant surface of the cured polymer. It is especially preferred in the practice of this invention to select monomers which will provide a film shrinkage of the radiation polymerizable reactants of at least 10% upon cure. Percent shrinkage is defined as follows:

$$\frac{(d2 - d1)}{d1} \times 100 = \text{Percent Shrinkage,}$$

wherein d1 is the density of the liquid coating composition and d2 is the density of the cured coating composition.

Monomers which provide a shrinkage of at least 10% or more upon curing from monomer to homopolymer are especially preferred in the practice of this invention. Especially preferred monomers in the practice of this invention include hexanediol diacrylate, trimethylolpropane triacrylate and tripopyleneglycol diacrylate.

The waxes which can be utilized in the practice of this invention can be any natural or synthetic wax such as bees wax, carnauba, paraffin, chlorinated naphthalenes, polyolefins, and especially the fluoronated and/or chlorinated polyolefins such as polytetrafluoroethylene. (PTFE). The PTFE waxes are especially preferred in the practice of this invention due to their ability to rapidly reduce gloss, and to provide a smooth surface upon cure of the coating in the presence of oxygen. PTFE wax is readily commercially available and can be obtained predispersed in unsaturated monomers.

The amount of wax incorporated into the radiation polymerizable compositions of this invention should be present in amount sufficient to reduce the 60° gloss of the cured coating to a gloss level less than 40, preferably less than 30, and most preferred less than 25, when the coating is cured by exposure to radiation in the presence of oxygen to provide a dry film thickness of 1.0±0.1 mil. It should be understood that the dry film thickness of 1.0±0.1 mil is utilized merely to characterize the effect of the wax and that film thicknesses of the radiation curable coating greater than or less than 1.0 mil are also practical. Typically, dry film thicknesses of the cured coating composition will range from about 0.1 to about 10 mils.

In order to provide the low glosses desired in this invention, typically the weight ratio of radiation polymerizable reactant to wax will be between 90/10 and 65/35, and preferably between 85/15 and 70/30.

The polymerization of the curable compositions can be effected with, for example, UV light or electron beam or visible light and will typically include a suitable initiator for this cure. Polymerization is especially preferred by exposure to UV light. Suitable initiators include: acylphosphine oxides such as 2,4,6-trimethylbenzoyl diphenyl phosphine oxide, benzoyldiethoxyphosphine oxide and 2,4,6-trimethylbenzoyl dinaphthyl phosphine oxide; Michler's ketone; benzil; 2-chlorothioxanthone; 2,4-diethylthioxanthone; 2,4-diisopropylthioxanthone; 2-benzyl-2-(dimethylamino)-1-(4-(4-morpholinyl)phenyl)-1-butanone commercially available as IRGACURE® 369; camphoroquinone and mixtures thereof. Additional initiators include: acyloin and derivatives thereof, such as benzoin, benzoin methyl ether, benzoin ethyl ether, benzoin isopropyl ether commercially available as VICURE-30 from Stauffer Chemicals, benzoin isobutyl ether commercially available as TRIGONAL-14 from Noury, and methylbenzoin; diketones such as diacetyl; aromatic diketones such as anthraquinone; phenones such as acetophenone, 2,2,2-tribromo-1-phenylethanone, 2,2-diethoxyacetophenone, 2,2-dimethoxy-2-phenylacetophenone commercially available as IRGACURE® 651 from Ciba Geigy, 2,2,2-tribromo-1-(2-nitrophenyl)ethanone, benzophenone, and 4,4-bis (dimethylamino)benzophenone, 2-hydroxy-2-methyl-1-phenyl-propan-1-one commercially available as DAROCUR® 1173 from Ciba Geigy, hydroxycyclohexyl phenyl ketone commercially available as IRGACURE® 184 from Ciba Geigy, 2-methyl-1-(4-(methylthio)phenyl)-2-morpholino-propanone-1 commercially available as IRGACURE® 907 from Ciba Geigy, 2,2-dichloro-1-(4 phenoxyphenyl)ethanone commercially available as SANDORAY-1000 from Sandoz, chlorinated benzophenone aryl ketone commercially available as FI-4 from Eastman Kodak, and α-isobutyl-α-phenyl acetophenone commercially available as VICURE-10 from Stauffer Chemicals.

The total amount of photoinitiator present in the curable coating composition is generally in the range of about 0.05–10% by weight of the total composition, preferably between about 0.2% and about 7%.

It is especially preferred in the practice of this invention to utilize a benzophenone, or substituted benzophenone, as at least part of the initiator package, usually in combination with additional initiators. The benzophenone is frequently used in combination with an amine synergist such as a tertiary amine. A particularly preferred initiator composition comprises both an alpha cleavage initiator and a hydrogen abstraction initiator.

The curable compositions of this invention can also include additives which do not adversely effect curing of the coating. Suitable amounts of pigments, solvents, thixotropes, flow control additives, diluents, light stabilizers and other materials can be utilized. It is especially preferred in the practice of this invention to incorporate alumina or silica pigments and, in particular, the addition of colloidal silica or alumina which has been treated with an unsaturated silane or other unsaturated material to provide curable unsaturated sites on its surface is especially preferred to provide thixotropy control and improved cure. Most preferably, colloidal silica treated according to the process of U.S. Pat. No. 4,644,077 is included in the coating composition of the present invention. The treated silica will typically be present at a level of about 5 to about 40% by weight based upon the weight solids of the curable composition.

The curable compositions of this invention may typically be applied to any substrate such as metal, plastic, wood, glass, synthetic fibers, etc. by brushing, dipping, roll coating, flow coating, spraying or other method conventionally employed in the art. An especially preferred substrate for the practice of this invention includes flexible planar sheets such as polycarbonate, polyester, polyacrylate, polyvinylchloride or polyolefin sheet materials. If desired, the flexible planar sheets can be metallized for reflectivity as is known in the art. The curable composition will be applied to the substrate typically to provide a film thickness of at least about 0.1 mil and will typically be applied between 0.1 and 10 mils dry film thickness.

The sheet may be pigmented or transparent and may contain various additives including plasticizers, fillers, etc. If desired, the sheet can be provided with a surface treatment to improve adhesion. For example, the sheet can be treated with an oxidizing agent, by flame treatment, or by corona discharge, or optionally could be coated with a primer prior to application of the curable coating. The coating can be applied to one side of the flexible sheet and exposed to suitable radiation for cure in the presence of oxygen. In a preferred embodiment, the second side of the sheet can be coated with an adhesive either before or after the application of the curable coating. Any suitable adhesive can be used. For example, the adhesive could be a hot melt adhesive which is applied to the sheet from solution or from the melt and subsequently allowed to dry or cool on the sheet surface. Alternatively, the adhesive could be a contact adhesive which is soft and adhesive at room temperature and would include an anti-adhesive protective backing applied to the surface of the adhesive and subsequently stripped off before the sheet is adhesively applied to a substrate.

Once the coating has been applied and cured, the flexible sheet can be either immediately applied to a substrate or formed into rolls or other convenient packaging and transferred to another location for final application to a substrate.

The curing of the coating in the presence of oxygen is completed by sufficient exposure to radiation to obtain the desired degree of cure. In the practice of this invention, it is generally not necessary to provide any additional thermal cure or subsequent exposure to radiation in the absence of oxygen in order to effectuate sufficient cure, although these steps could be taken if desired for special applications. The curing is accomplished by exposing the coating to suitable radiation sources such as mercury lamps, xenon lamps, argon lamps, metal halide lamps, electron beams, or other device to produce the radiation.

The following examples have been selected to illustrate specific embodiments and practices of advantage to a more complete understanding of the invention. Unless otherwise stated, "parts" means parts-by-weight and "percent" is percent-by-weight.

A representative example of a coating which can be applied and cured as taught herein can be prepared by admixing the following materials:

EXAMPLE I

| Raw Material | Parts |
| --- | --- |
| surface treated silica[1] | 7.1 |
| 1,6 hexanediol diacrylate | 13.9 |
| trimethylolpropane triacrylate | 3.5 |
| isopropanol | 0.5 |
| rheology modifier[2] | 25.0 |
| 40% PTFE (average particle size 1.0–2.0 micron) in tripropyleneglycol diacrylate[3] | 25.0 |
| 40% PTFE (average particle size 3.5–5.5 micron) in tripropylene glycol diacrylate[4] | 25.0 |
| surfactant[5] | 0.5 |
| initiator[6] | 3.85 |
| amine synergist[7] | 1.93 |

[1]approximately 5.6 parts colloidal silica treated with 1.5 parts trialkoxy silane propyl methacrylate as taught in U.S. 4,644,077.
[2]gelled hexanediol diacrylate thixotrope KS-239 from Kustom Services, Inc.
[3]Ultraglide UV 701 from Shamrock Technologies Inc.
[4]Ultraglide UV 704 from Shamrock Technologies Inc.
[5]Dow Corning 57 silicone glycol surfactant.
[6]Irgacure 500 from Ciba Additives—50/50 mix of benzophenone/1-hydroxy cyclohexyl phenyl ketone.
[7]Ebercryl P115 amine synergist from UCB Chemicals Corp.

This coating can be applied to a substrate and cured by exposure to UV light under atmospheric air to produce a low gloss, hard coating which erasibly accepts dry erase marker.

While this invention has been described by a specific number of embodiments, other variations and modifications may be made without departing from the spirit and scope of the invention as set forth in the appended claims. The entire disclosures of all applications, patents, and publications cited herein are hereby incorporated by reference.

What is claimed is:

1. A flexible sheet having a first side and a second side opposite to the first side, wherein the second side is coated with an adhesive material, and wherein said first side is coated with a cured film; wherein the cured film is obtained by a process which comprises:
    (i) applying to said first side of the substrate a radiation curable liquid coating composition comprising:
        (a) at least one radiation polymerizable reactant;
        (b) at least one initiator for initiating cure;
        (c) at least one wax; and
    (ii) exposing the applied coating composition to radiation in the presence of oxygen until cured;
wherein the oxygen is present in an amount sufficient to inhibit, but not prevent, the surface cure of the coating.

2. The flexible sheet of claim 1 wherein the radiation is ultraviolet radiation.

3. The flexible sheet of claim 1 wherein the radiation polymerizable reactant comprises at least one radiation polymerizable monomer.

4. The flexible sheet of claim 3 wherein the monomer comprises hexanedioldiacrylate.

5. The flexible sheet of claim 3 wherein the monomer comprises trimethylolpropane triacrylate.

6. The flexible sheet of claim 3 wherein the monomer comprises tripropyleneglycol diacrylate.

7. The flexible sheet of claim 1 wherein the substrate is a flexible planar sheet.

8. The flexible sheet of claim 7 wherein the sheet is selected from the group consisting of polycarbonate, polyester, polyacrylate, polyvinyl chloride or polyolefin sheet.

9. The flexible sheet of claim 1 wherein the sheet is metallized.

10. The flexible sheet of claim 1 wherein the wax is present in an amount sufficient to reduce the 60° gloss of the cured coating to a gloss less than 40 when the coating is applied to provide a dry film thickness of 1.0±0.1 mil and cured by exposure to ultraviolet radiation in the presence of oxygen sufficient to inhibit, but not prevent the surface cure of the coating.

11. The flexible sheet of claim 1 wherein the wax comprises polytetrafluoroethylene wax.

12. The flexible sheet of claim 1 wherein the curable liquid coating also incorporates a silica or alumina pigment.

13. The flexible sheet of claim 12 wherein the silica or alumina has been surface treated to provide curable unsaturated sites on the silica or alumina.

14. The flexible sheet of claim 1 wherein the initiator comprises a benzophenone or substituted benzophenone initiator.

15. The flexible sheet of claim 14 wherein the initiator includes a synergist for the benzophenone or substituted benzophenone initiator.

16. The flexible sheet of claim 15 wherein the synergist is an amine.

17. The flexible sheet of claim 1 wherein the curable liquid coating also contains a thixotrope.

18. The flexible sheet of claim 3 wherein at least one of the monomers exhibits a shrinkage of at least 10% when cured as a homopolymer.

19. The flexible sheet of claim 1 wherein the weight ratio of radiation polymerizable reactant to wax is between 90/10 and 65/35.

20. The flexible sheet of claim 18 wherein the weight ratio of radiation polymerizable reactant to wax is between 85/15 and 70/30.

21. The flexible sheet of claim 1 wherein the wax is present in an amount of at least 10% by weight of the combined weight of polymerizable reactant and wax.

22. The flexible sheet of claim 1 wherein the cured film can erasibly accept markings from a dry erase writing implement.

23. A substrate having adhesively applied to at least one surface thereof a flexible sheet, wherein said flexible sheet has a first side and a second side opposite to the first side, and wherein the second side is coated with an adhesive material which is applied to said substrate surface, and wherein said first side is coated with a cured film; wherein the cured film is obtained by a process which comprises:
   (i) applying to said first side of the substrate a radiation curable liquid coating composition comprising:
      (a) at least one radiation polymerizable reactant;
      (b) at least one initiator for initiating cure;
      (c) at least one wax; and
   (ii) exposing the applied coating composition to radiation in the presence of oxygen until cured;
wherein the oxygen is present in an amount sufficient to inhibit, but not prevent, the surface cure of the coating.

24. The substrate of claim 23 wherein the cured film of coating can erasibly accept markings from a dry erase writing implement.

25. The substrate of claim 23 wherein the radiation polymerizable reactant comprises at least one radiation polymerizable monomer.

26. The substrate of claim 25 wherein the monomer comprises hexanedioldiacrylate.

27. The substrate of claim 25 wherein the monomer comprises trimethelylolpropane triacrylate.

28. The substrate of claim 25 wherein the monomer comprises tripopylene glycol diacrylate.

29. The substrate of claim 23 wherein the coating also incorporates a silica or alumina pigment.

30. The substrate of claim 29 wherein the silica or alumina has been surface treated to provide curable unsaturated sites on the silica or alumina.

31. The substrate of claim 30 wherein the silica or alumina has been treated with an unsaturated silane to provide curable unsaturated sites on the alumina or silica.

32. The substrate of claim 23 wherein the photoinitiator includes a benzophenone or substituted benzophenone.

33. The substrate of claim 32 wherein the photoinitiator includes a synergist for the benzophenone or substituted benzophenone initiator.

34. The substrate of claim 33 wherein the synergist is an amine.

35. The substrate of claim 23 wherein the coating also contains a thixotrope.

36. The substrate of claim 25 wherein at least one of the monomers exhibits a shrinkage of at least 10% when cured as a homopolymer.

37. The substrate of claim 23 wherein the wax comprises a polytetrafluoroethylene wax.

38. The substrate of claim 23 wherein the initiator comprises both an alpha cleavage initiator and a hydrogen abstraction initiator.

39. The substrate of claim 23 wherein the weight of radiation polymerizable reactant to wax is between 90/10 and 65/35.

40. The substrate of claim 39 wherein the weight ratio of radiation polymerizable reactant to wax is between 85/15 and 70/30.

41. The substrate of claim 23 wherein the wax is present in an amount of at least 10% by weight of the combined weight of polymerizable reactant and wax.

* * * * *